United States Patent [19]
Jeffers et al.

[11] Patent Number: 5,691,682
[45] Date of Patent: Nov. 25, 1997

[54] VERY HIGH FIELD MICRO MAGNETIC ROLLER AND METHOD OF MAKING SAME

[75] Inventors: Frederick John Jeffers, Escondido, Calif.; Svetlana Reznik; J. Kelly Lee, both of Rochester, N.Y.

[73] Assignee: Eastman Kodak Company, Rochester, N.Y.

[21] Appl. No.: 370,720

[22] Filed: Jan. 10, 1995

[51] Int. Cl.[6] .................................................... H01F 7/02
[52] U.S. Cl. ........................................... 335/302; 335/306
[58] Field of Search .......................................... 335/302-6

[56] References Cited

U.S. PATENT DOCUMENTS

| | | | |
|---|---|---|---|
| Re. 34,229 | 4/1993 | Shimizu et al. | 335/302 |
| 4,326,908 | 4/1982 | Hiya et al. | 335/302 |
| 5,019,796 | 5/1991 | Lee et al. | 335/306 |

*Primary Examiner*—Lincoln Donovan
*Attorney, Agent, or Firm*—William F. Noval

[57] ABSTRACT

A very high field micro roller magnetic recorder of 20 poles having an outside diameter of 0.130" is disclosed, as is the method for making such a micro roller magnetic recorder. The phrase, "very high field", as applied to the micro roller recorder of the present invention is defined as a surface field intensity of at least 1000 Oe. Rather than mounting discrete magnets around the periphery of a non magnetic drum in fabricating a magnetic roller recorder, the present invention teaches use of a magnetizable cylinder of high energy magnetic material, such as NdFeB, magnetized to saturation in a pattern of circumferentially located poles by use of a fixture fabricated as follows. A solid conducive cylinder is slotted in the axial direction to generate a serpentine conductive pattern to which lead wires are connected. The cylinder is potted in epoxy, and the center bored out to accept the small diameter high magnetic energy roller to be magnetized. A charged capacitor bank, carefully sized to provide a current pulse to completely saturate the high energy magnetic material without the risk of exploding the fixture is discharged through the winding of the fixture to magnetize the pole pattern of the roller.

17 Claims, 2 Drawing Sheets

VERY HIGH FIELD MICRO MAGNETIC ROLLER AND METHOD OF MAKING SAME

BACKGROUND OF THE INVENTION

1. Field of the Invention

This invention relates to magnetic recording, and in particular to a very high field magnetized micro roller recorder for repetitive or encoded recording, and the method of making same.

2. Description Relative to the Prior Art

The use of a magnetic roller for recording repetitive or encoded information is known in the art, and a very high field magnetic roller recorder to meet such requirements has been disclosed in U.S. patent application Ser. No. 08/346,722, filed Nov. 20, 1994 entitled, "Very High Field Magnetic Roller Recorder". The magnetic roller recorder of the above referenced application consists of a non magnetic cylinder having a diameter of approximately 2" with 204 NdFeB miniature bar magnets mounted around the periphery of the cylinder. These discrete bar magnets, which have a thickness of 0.130" in the radial direction, only increase the radius of the roller by about 13% when they are mounted on the cylinder's circumference, and positioning them around the 6" circumference is a manageable undertaking. However, the above technique is inapplicable in fabricating a micro encoder having a small roller diameter. For a micro roller having a 0.130" diameter, attempts to utilize 0.130" thick discrete magnets would unacceptably triple the diameter of the roller, and decreasing the thickness of the magnets would not only reduce their magnetic effectiveness, but would also limit their structural integrity.

In the prior art, magnetizing of a roller fabricated from a cylinder of magnetic material has utilized fixtures made by threading heavy gauge wire through holes in a block of phenolic or other suitable insulating material. The threading of the wire through the holes is done in a serpentine pattern generating the alternating poles of the magnetized roller when a high current pulse is fired through the fixture. Until recently, the requirements for the number of poles and the pole pitch have been modest. Typical magnetic rollers for copiers, for example, contain 6 to 10 poles, and the pole pitch has been on the order of 0.2" circumferentially. For a 20 pole roller having a diameter of only 0.130", the pitch must be 0.02"; an increase by a factor of 10 in packing the magnetized poles closer than that attained by use of the magnetizing fixtures known in the prior art.

SUMMARY OF THE INVENTION

The present invention discloses a very high field micro roller magnetic recorder of 20 poles having a roller diameter of only 0.130", and further discloses the method for making such a micro roller magnetic recorder. The phrase, "very high field", as applied to the micro roller recorder of the present invention is defined as a surface field intensity of at least 1000 Oe.

Rather than mounting discrete magnets around the periphery of a non magnetic drum in fabricating a micro roller magnetic recorder, the present invention teaches use of a magnetizable cylinder of high energy magnetic material, such as NdFeB, $SmCo_5$, or Ba Ferrite magnetized to saturation in a pattern of circumferentially located poles by use of a fixture fabricated as follows.

A solid conductive cylinder is slotted in the axial direction to generate a serpentine conductive pattern to which lead wires are soldered. The cylinder is potted in epoxy, and the center bored out to accept the small diameter high magnetic energy roller to be magnetized. A charged capacitor bank, carefully sized to provide a current pulse to completely saturate the high energy magnetic material without the risk of exploding the fixture, is discharged through the winding of the fixture to magnetize the pole pattern of the roller.

BRIEF DESCRIPTION OF THE DRAWINGS

The invention will be described with respect to the drawings of which.

DESCRIPTION OF THE PREFERRED EMBODIMENTS

Figure 1:
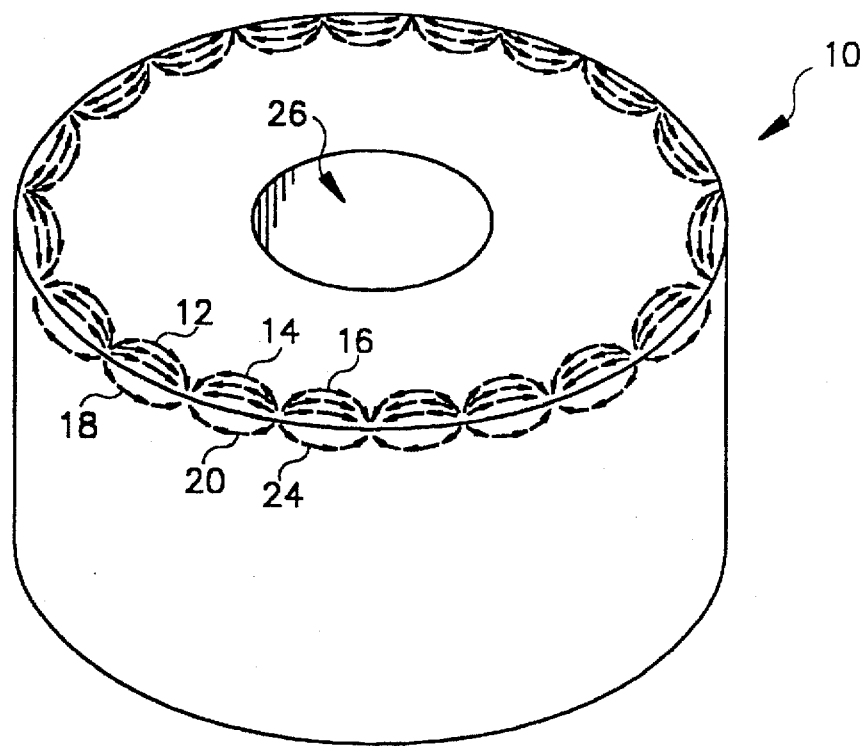
FIG. 1 is a drawing of the micro roller of the invention illustrating pole locations at the periphery of the roller.

Referring to FIG. 1, a micro magnetic roller 10 for recording a repetitive pattern is magnetized with 20 poles having alternating directions of magnetization, e.g,. 12,14, 16, having typical external field lines, e.g. 18,20,24. The roller 10 is fabricated from the high energy material NdFeB having a magnetic energy product, $(BH)_{max}$, of from 4–20 MGOe. An axial hole 26 is provided to accept a non-magnetic shaft (not shown) for roller recorder operation. Typical dimensions of the present micro roller 10 are: outside diameter=0.130", inside diameter=0.055" and length=0.059". The roller recorder of FIG. 1 has a surface field of up to 4000 Oe and can at least partially magnetize a slave media having a coercivity of 4000 Oe by direct rolling contact.

Figure 2:
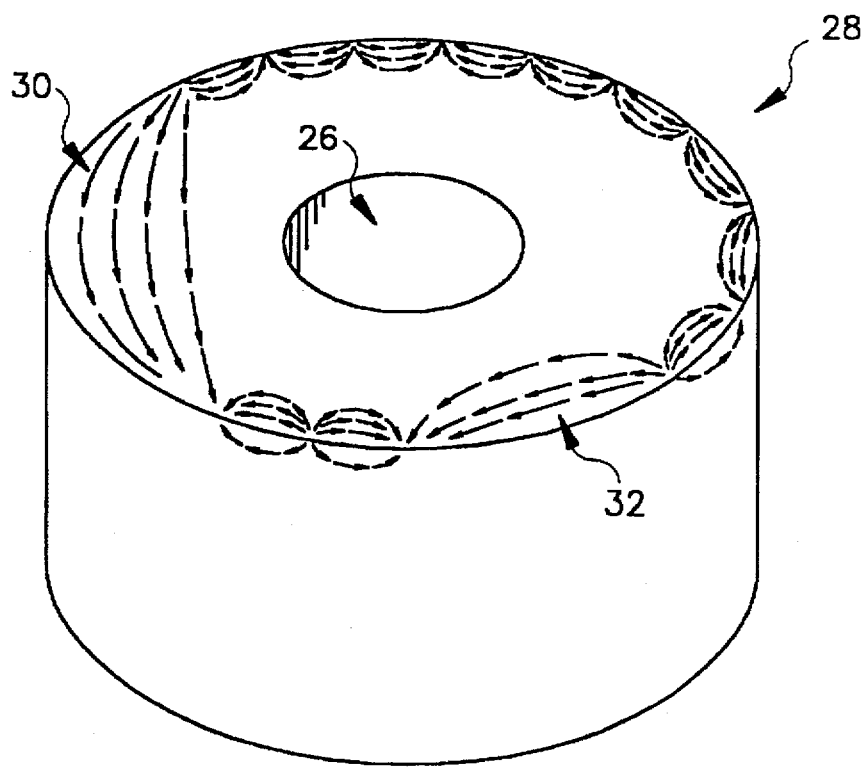
FIG. 2 is a drawing of the pole positions of a micro roller having a binary pattern of pole positions.

In FIG. 2, a roller recorder 28 configured to record encoding information has provisions for 20 poles, but unlike the repetitive roller of FIG. 1, the 20 poles are not contiguously alternating. For example, 5 adjacent pole positions at segment 30 are magnetized in the same direction, and another 3 pole positions at segment 32 are similarly magnetized. This provides a specific binary code generated by the roller. By pre-selecting the directions of magnetizations of the 20 pole positions, up to $2^{20}$ sequences may be encoded.

Figure 3:
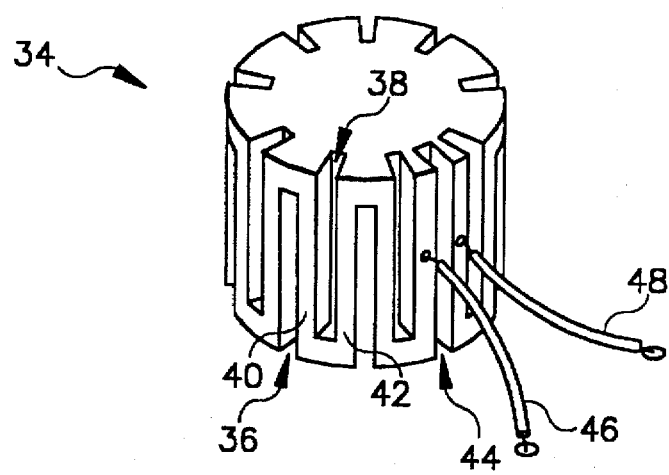
FIG. 3 illustrates the partially fabricated fixture of the invention.

Referring to FIG. 3, the magnetizing fixture of the invention is fabricated from a solid conductive cylinder, 34, preferably copper, having axially directed slots spaced around the periphery of the cylinder 34. Alternate slots, e.g. 36,38, break through the opposite ends of the cylinder 34 to form a serpentine conductive pattern around the circumference of the cylinder 34. The slots are spaced so that the resultant lands, e.g. 40, 42 are equal in width to the slots, e.g. 36,38. One slot 44 breaks through both ends of the cylinder 34 splitting the circumference to provide terminal ends for the magnetizing circuit, and lead wires 46,48 are attached to the ends to provide a current path into the fixture.

Figure 4:
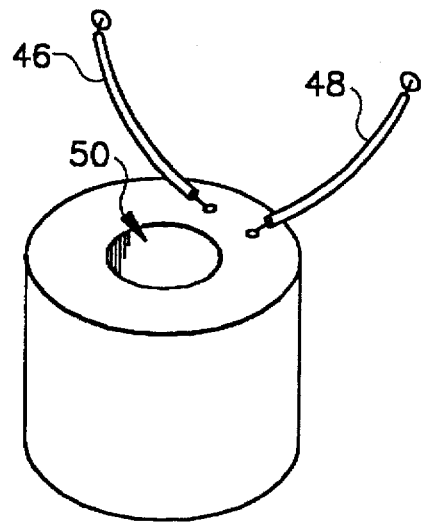
FIG. 4 is a drawing of the fixture of the invention after potting and coring of the fixture.

The cylinder 34 is then potted using an insulating epoxy, and the center of the cylinder 34 is axially cored out, (FIG. 4), to provide a cavity 50 into which the magnet to be magnetized fits with a small amount of clearance.

Figure 5:
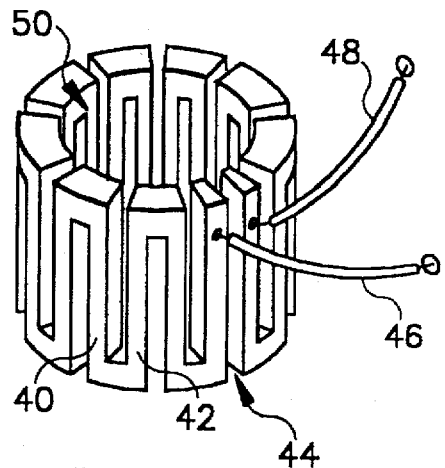
FIG. 5 is a drawing useful in understanding the invention.

The electrical structure of the fixture after the center of the cylinder 34 is cored out may be understood from FIG. 5, which for clarity, shows the copper fixture without its epoxy coating. Starting at the slot 44, which splits the circumference of the core, it will be appreciated that a serpentine winding surrounds the cavity 50, and that currents flowing in this winding will be in opposite directions in successive lands, e.g. 40,42, and consequently oppositely directed magnetic fields will be generated by the current flowing through the successive lands. These fields correspondingly magnetize the magnetic material positioned in the cavity 50, each land around the circumference magnetizing one pole of the roller.

As similarly described for the micro roller supra, the fixture may be structured to magnetize a roller with encoded data by selectively slotting the cylinder to correspond to the binary representation of the information to be encoded.

The invention is directed to the magnetization of high coercivity rollers. To insure saturation of the magnetic material it is necessary that the magnetizing field be greater than the coercivity of the material being magnetized. This requires sufficient current flowing in the magnetizing fixture to provide the required field. On the other hand, too high a current can result in electromagnetically induced stresses of sufficient intensity to cause the fixture to explode. To magnetize the above referenced micro roller of NdFeB, coercivity about 4000 Oe, with OD=0.139", ID=0.055", L=0.02", and having 20 poles, a Model 8500 magnetizer, manufactured by Magnetic Instrumentation, Inc., had its capacitor bank tailored to the size of the fixture. The magnetizer's capacitor bank, set at 200–400 microfarads was charged to 1000 volts and discharged by an Ignitron through the fixture. Current pulses on the order of 50,000 amperes, lasting approximately 50–100 microseconds saturate the NdFeB roller without damage to the fixture.

An alternate method of magnetizing the micro roller utilizes the very high field roller having a 2" diameter which is disclosed in U.S. patent application Ser. No. 08/346,722, described supra. This roller has a surface field of about 10,000 Oe, and by rolling it in contact around the circumference of the micro roller having a coercivity of 4,000 Oe, the magnetic pattern of the 2" roller is directly recorded onto the micro roller.

The invention has been described in detail with particular reference to preferred embodiments thereof, but it will be understood that variations and modifications can be effected within the spirit and scope of the invention. For example, magnetic materials having energy products of approximately 1 MGOe may be used in micro roller recorders by following the teachings of the invention.

What is claimed is:

1. A micro magnetic roller recorder comprising:
   a) a cylindrical roller of solid magnetic material,
   b) a plurality of poles magnetized in said magnetic material, said poles located around the periphery of said roller, wherein said poles represent encoded data to be recorded on magnetic media,
   c) said material having an energy produce of at least $4-20 \times 10^6$ GOe, and
   d) said roller having a diameter less than 0.2".

2. The magnetic roller recorder of claim 1 having at least 20 poles.

3. The magnetic roller recorder of claim 1 wherein said magnetic material is either NdFeB, SmCo$_5$, or Ba Ferrite.

4. The magnetic roller of claim 1 having a surface magnetic field of at least 3–4000 Oe.

5. A micro magnetic roller recorder for recording a binary pattern on a slave magnetic medium, said roller record comprising:
   a) a cylindrical roller solid magnetic material,
   b) at least one pole magnetized in said magnetic material, said pole being located on the periphery of said roller, said pole representing encoded data to be recorded on magnetic media,
   c) said material having an energy product of at least $4-20 \times 10^6$ GOe, and
   d) said roller having a diameter less than 0.2".

6. The magnetic roller recorder of claim 5 wherein said magnetic material is either NdFeB, SmCo$_5$, or Ba Ferrite.

7. The magnetic roller of claim 5 having a surface magnetic field of at least 3–4000 Oe.

8. A method of magnetizing a pole pattern on a magnetic micro roller recorder comprising the steps of:
   a) slotting the periphery of a conductive cylinder to replicate said pole pattern as a serpentine conductive path, said conductive path having a beginning point and an ending point whereby current entering said beginning point flows through said conductive path and exits from said ending point,
   b) connecting a first conductive lead to said beginning point, and a second conductive lead to said ending point,
   c) potting said slotted conductive cylinder with an insulating potting material,
   d) axially coring said cylinder to provide a cavity having a diameter of less than 0.5" for accepting said roller recorder,
   e) inserting said roller recorder in said cavity for magnetizing, and
   f) flowing a current through said serpentine conductive path through said first conductive lead and said second conductive lead whereby magnetic fields are generated causing said pole pattern to be magnetically recorded on said roller recorder.

9. The method of claim 8 wherein said conductive cylinder is Cu.

10. The method of claim 8 wherein said potting material is an epoxy material.

11. The method of claim 8 wherein said flowing a current includes generating said current as a current pulse by discharging a capacitor bank charged to a selected voltage through said serpentine conductive path.

12. The method of claim 11 wherein said capacitor bank is between 200–400 farads.

13. The method of claim 11 wherein said selected voltage is about 1000 volts.

14. The method of claim 11 wherein the width of said current pulse is about 50–100 microseconds.

15. The method of claim 11 wherein the peak current of said current pulse is about 50,000 amperes.

16. A method of magnetizing a micro roller recorder having a diameter of less than 0.5" and an energy product of approximately $7 \times 10^6$ GOe, said method comprising rolling the circumference of said micro roller recorder on the circumference of a magnetized roller recorder having a surface field of approximately 10,000 Oe.

17. In a magnetic recording system including magnetic media and apparatus for recording encoded data on said medium, said apparatus comprising:
   a cylindrical roller of solid magnetic material;
   a plurality of poles magnetized in said magnetic material, said poles located around the periphery of said roller, wherein contiguous poles are not contiguously alternating and represent a specific binary code to be recorded on said magnetic media;
   said magnetic material having an energy product of at least $4-20 \times 10^6$ GOe and
   said roller having a diameter less than 0.2".

* * * * *